United States Patent [19]

Thomason

[11] Patent Number: 4,852,547

[45] Date of Patent: Aug. 1, 1989

[54] HEAT STORAGE

[76] Inventor: Harry E. Thomason, 609 Cedar Ave., Fort Washington, Md. 20744

[21] Appl. No.: 279,253

[22] Filed: Nov. 28, 1988

Related U.S. Application Data

[60] Continuation of Ser. No. 428,075, Sep. 29, 1982, abandoned, which is a continuation-in-part of Ser. No. 237,960, Feb. 25, 1981, abandoned, which is a division of Ser. No. 66,497, Aug. 14, 1979, Pat. No. 4,265,219, which is a division of Ser. No. 398,323, Sep. 18, 1973, Pat. No. 4,102,327.

[51] Int. Cl.$^4$ .................................. F24J 2/42
[52] U.S. Cl. ...................... 126/427; 126/437
[58] Field of Search ............... 126/427, 432, 436, 437, 126/400; 165/18; 219/279

[56] References Cited

U.S. PATENT DOCUMENTS

| 4,143,814 | 3/1979 | Hill | 126/437 X |
| 4,213,563 | 7/1980 | van Kuijk | 126/419 X |
| 4,339,930 | 7/1982 | Kirts | 126/419 X |
| 4,406,136 | 9/1983 | Picchiottino | 126/427 X |

FOREIGN PATENT DOCUMENTS

| 0006211 | 1/1980 | European Pat. Off. | 126/437 |
| 2394765 | 2/1979 | France | 126/422 |
| 2461889 | 3/1981 | France | 126/437 |

Primary Examiner—Margaret A. Focarino

[57] ABSTRACT

The present invention comprises heat-storage means to store heat in a tank of liquid, and back-up heat means. The back-up heat means comprise more than one source of heat, which can produce back-up heat and heated liquid at various temperatures (for example, LOW and HIGH-temperatures). And, there are more than one heat-use means (for example, LOW and HIGH-temperature heat use means). And, there are a number of means to conduct the flow of the heated fluid among the heat-storage means, the back-up heat means, and the heat-use means.

10 Claims, 1 Drawing Sheet

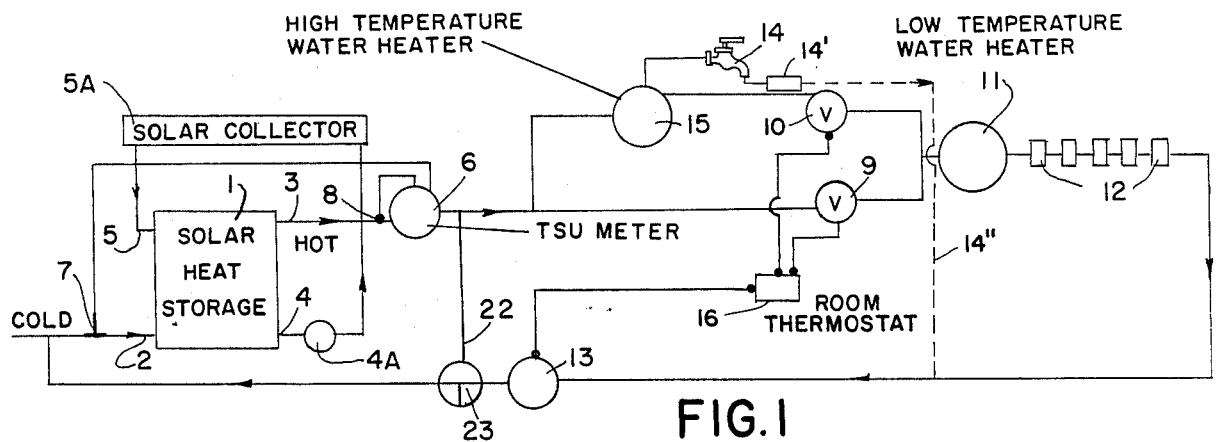
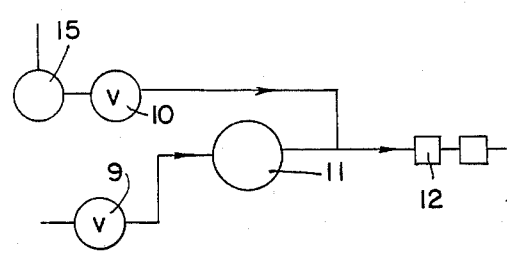
FIG. 2
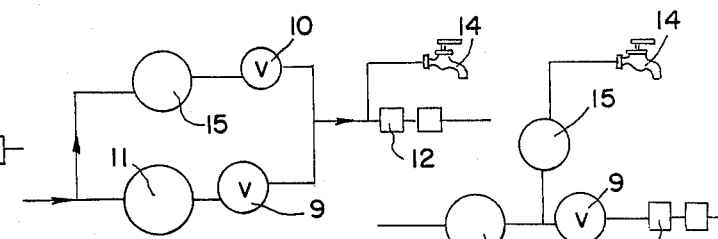
FIG. 3
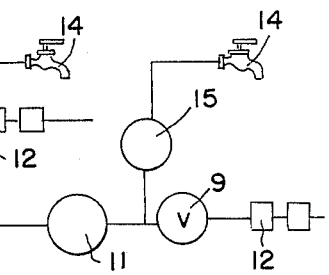
FIG. 4
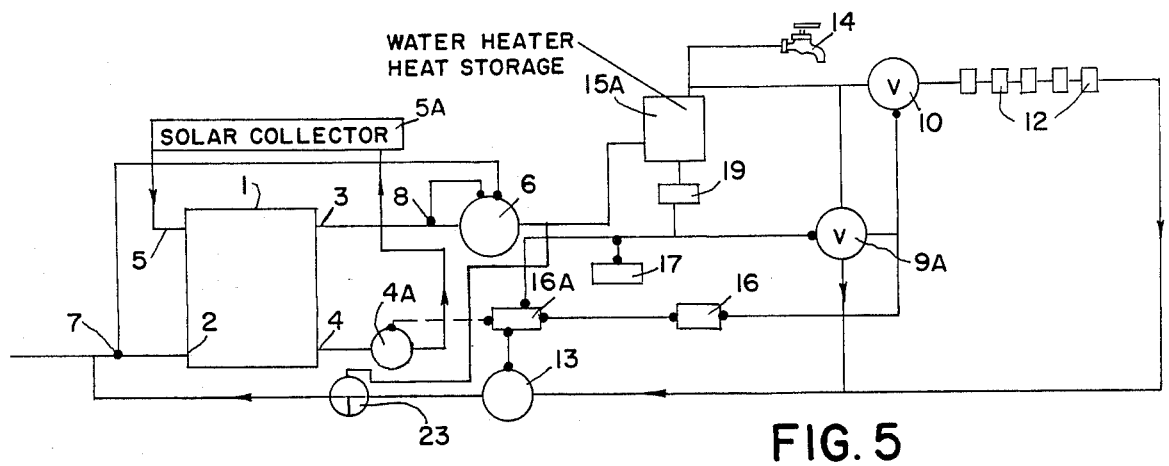
FIG. 5
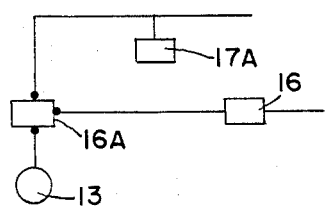
FIG. 5A
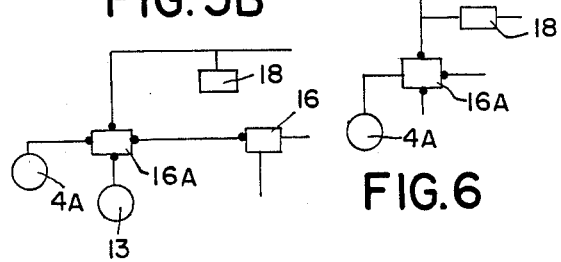
FIG. 5B
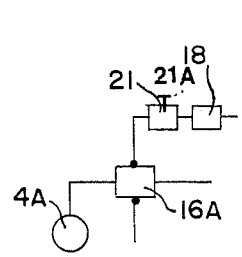
FIG. 6     FIG. 7

HEAT STORAGE

INTRODUCTION

This application is a continuation of Ser. No. 06/428075 filed 9/29/82 now abandoned, which is a continuation-in-part of Ser. No. 06/237,960 filed 2/25/81 and now abandoned, which is a divisional case from Ser. No. 66,497, filed 8/14/79 and now U.S. Pat. No. 4,265,219; which is a divisional case from Ser. No. 398,323 filed 9/8/73 and now U.S. Pat. No. 4,102,327.

In order to get the most possible T.S.U.s out of a solar heating system the heat must be collected and used at the lowest temperatures reasonably possible because high-temperature solar collection results in lower efficiencies. (100,000 BTU's of solar-produced heat actually delivered=1 T.S.U./Thomason Solar Unit.) Solar-heated DOMESTIC water is one of the common uses of solar heat. Solar homeheat (SPACE HEATING) is another of the common uses. Solar-heated domestic water supplied to loads requiring different temperatures is another common use. (Examples; bath water at 100°–110° F.; clothes washing at 120°–140° F.; dish washing, cooking, etc. at 160°–180° F.) In some cases the domestic water is used and then flows down the drain. In other cases the solar-heated water flows "in-circuit": as examples; out to hotel/motel rooms and back (always warm or hot); out through radiators, baseboard heaters, fan-coils, etc. (out hot and return warm). At times very little or no backup heat is needed. Or, backup heat must be "poured on" at times, if even for brief periods. The modifications of FIGS. 1 to 4 illustrate apparatus for obtaining all those desirable functions.

Also, extra storage for solar-produced heat is desirable in some cases and can be obtained at very little extra cost. The modifications of FIGS. 5, 5A and 5B illustrate apparatus for obtaining that desirable function by pumping solar-heated water to the backup heater at times.

IN THE DRAWINGS

FIG. 1 is a schematic of a preferred embodiment of the invention;

FIGS. 2, 3 and 4 are modifications;

FIG. 5 is another modification.

FIGS. 5A and 5B are further modifications.

FIG. 6 is a modification to clear snow from solar heat collectors.

FIG. 7 is a modification to prevent solar heat-collector operation if the controller fails.

In FIG. 1 solar heat-storage apparatus 1 has a cold-water inlet 2 and a hot (warm) water outlet 3. The solar heat-collector loop is not shown in detail. Typically liquid (for example, water) is pumped from outlet 4 by pump 4A to the solar collectors 5A and solar-heated water returns in pipe 5. An example of solar heat-storage apparatus of a preferred type is explained in Thomason U.S. Pat. No. 4,343,293, known in the trade as a tank-within-a-tank. Of course, if the water to be used is not required to be potable and under pressure, then the solar-heated water itself may be used directly from outlet 3 or recirculated by pump 13, without a heat-exchanger or a tank-within-a-tank. (Although water is referred to herein it is obvious that other fluids could be used.)

As the water or other liquid flows out through "hot" outlet 3 it flows through a T.S.U. meter 6. For those unfamiliar with such a meter it has two sensors 7 and 8. The meter senses the temperature of cold water flowing in at 2 and the temperature of warm or hot water out at 3. The meter detects the number of units (gallons) of water flowing therethrough, the temperature-increase between cold water sensor 7 and warm (hot) water sensor 8, integrates those items and registers the number of T.S.U.s added to the water.

The TSU is equal to 100,000 BTUs of "pure" solar-produced heat. TSUs are unlike BTUs of energy fed into ordinary water heaters. Typical water heaters have energy-waste that astound most persons, like 50% ± of the heat-energy input going out through the insulation and adjacent pipes, up-the-stack, etc. Most gas-fired domestic water heaters consume more than 200,000 BTUs of gas in order to add 100,000 BTUs, or the equivalent of 1 T.S.U., to the water actually heated, after allowing for heat losses during non-firing periods, heat losses through tank insulation, imperfect combustion, etc. Where oil is used it is more like 222,222 BTUs used to equal 1 T.S.U. Even electric water heaters lose something like 30% of the energy fed into them. But, the T.S.U. meter registers the solar-heat energy actually added to the water, 100% pure solar heat. (The T.S.U. is named for its originators, the Thomasons, hence the Thomason Solar Unit.)

After passing through the T.S.U. meter the solar-heated water flows through valve 9 or valve 10 or both. If valve 9 is open then the water flows through LOW-temperature backup water heater-and-tank assembly or furnace 11 and "load" 12, and is thence circulated by pump 13 back to the cold-water inlet 2 to the solar heat storage container 1. If hot water is used at outlet 14 it must flow through HIGH-temperature backup water heater-and-tank assembly or furnace 15. Those backup heaters may be fired by electricity or gas or oil or wood or other.

Now, why two backup heaters and two valves? Backup heater 11 may be set for LOW TEMPERATURES, say 100° or 110° or so and heater 15 set for HIGH TEMPERATURES, say 140° or 180° or so for scalding-hot water to kill germs (washing dishes for example). The cold "city" water entering at 2 may be as cold as 38° to 40° during the winter (60° to 70° during the summer). The temperature by which it is raised by stored solar heat may be only a few degrees during long cloudy spells and/or during heavy-usage periods. At other periods backup heater 11 will not turn on at all. (Example: load 12 may be Hotel or Motel rooms using domestic water at 110° for showers, shaving, etc. and the solar-produced heat may be at 110° or 120° or 30°. Thus the backup heater does not turn on at all.)

In some cases solar-heated water at 80° or 90° or 100° from solar heat storage 1 is circulated by opening valve 9 and turning pump 13 on to circulate that warm water through load 12, which may be radiators or baseboard heaters or fan coils, anytime the first stage of the thermostat is calling for heat in the rooms. Then, if the temperature in the rooms drops, the second stage of the thermostat turns backup heater 11 on to produce hot water to meet the increased heat load.

Thus it is seen that load 12 may be warm domestic water in one case or may be space heat in another case, or may be both where the heated water is kept clean and potable (in copper pipes, copper finned tubing, copper fan coils, etc.). Load 12 operates at relatively low temperatures. Often solar-produced heat is adequate for 100% of the heating needs. No backup heat is used. But, backup heat is available by LOW-temperature heater 11 when/if needed. For high scalding-hot temperatures solar-produced heat often is not adequate (180°, for example). Then HIGH-temperature backup heater 15 supplements the solar-produced heat.

At times heater 11 may not be adequate to meet the heat load at 12. (Examples, during a bitter cold night, or during long cloudy spells when very little heat comes from solar.) In such event, valve 10 is opened and the hot water from heater 15 flows through heater 11 on to load 12. If the heater 11 was set to be off at high temperatures then it will remain off until valve 10 is closed and hot water is no longer flowing from heater 15.

From 14 the hot water may be used directly, or, it may pass on to a HIGH-temperature heat-use means 14'. If the tap or outlet 14 is a hot-water spigot, the hot water typically will flow down-the-drain. However, if 14 feeds to a heat-use means 14' where the outgoing heated water is to be preserved, that water may flow through line 14" back to the solar heat storage apparatus 1 and thence back to heater 15 for re-heating.

FIG. 2 illustrates a modification where valve 10 may be opened and the water may flow directly from heater 15 to load 12 without flowing through heater 11 at all. An example of possible usage would be a Hotel or Motel-heating load where a three-stage thermostat would call for the following: 1. STAGE 1, circulating pump 13 is on and valve 9 is open so that solar-heated water only flows to warm the rooms and/or the domestic water; 2. STAGE 2, valve 9 remains open and low-temperature backup heater 11 is turned on to supplement heat from solar heat storage; 3. STAGE 3, high-temperature heater 15 is turned on and valve 10 is opened to allow hot water to flow to load 12.

During STAGE 3 operation valve 9 could be closed and heater 11 could be OFF in a typical installation where high-temperature heater 15 is adequate to meet the heat loads at both 12 and 14. However, both valves 9 and 10 could be opened and both heater 11 and 15 fired simultaneously if added total heat capacity were needed.

FIG. 3 illustrates a modification wherein either the output of heater 11 or heater 15, or both, may be passed on to either load 12 or tap 14 or both.

FIG. 4 illustrates a modification wherein no valve is necessary insofar as heater 15 is concerned, and even valve 9 could possibly be eliminated. Pump 13 will be turned ON when heat is needed at load 12. As in FIGS. 1, and 2, water can flow directly out at tap 14 without use of an additional valve. And yet the outputs of both heaters 11 and 15 are available in series when water is drawn from tap 14. An example could be: stored solar heat would warm the cold city water from 40° up to 100°; water heater 11 would warm the water up to 120°; the water would flow through heater 15 which would heat it up to 160° and that 160° water would flow from tap 14; OR, when valve 9 was opened and/or pump 13 energized, 120° water would flow to load 12.

In FIGS. 1 to 4 valve 9 and/or valve 10 could be eliminated for some types of installations by careful plumbing so that no flow will occur when pump 13 is OFF. Indeed, the recirculation loop and pump 13 may be omitted for some types of installations if FIGS. 1 to 4.

Although only two backup heaters are shown to warm the water to a LOW or a HIGH temperature (or both), it is obvious that other temperatures in-between could easily be obtained by mixing the outputs, or by adding another backup heater set for another temperature, or by adjusting the water heater (furnace) thermostat settings higher or lower, or by other obvious means.

In some cases stored solar heat may be at such a low temperature level that only backup heat is to be used. Example, after a series of cloudy days the stored solar heat temperature at 1 may be down to 65° to 75° and temperatures going to load 12 may have to be 100° to 125° in order to keep the rooms warmed to 70°. OR, the stored solar heat may be down to 35° to 45° and the temperatures going to load 12 may have to be at 60° to 80° to prevent freezing in the area heated by load 12.

In such cases, when backup heat is being supplied from heater 11 and/or 15, the outlet from load 12 may be at higher temperatures than those in solar heat storage 1. Then, circulating that backup heat back to solar storage 1 should be avoided. To prevent such operations a bypass 22 with valve 23 may be installed to permit pump 13 to circulate (warm) water from the outlet of lead 12 back through backup heater 11 or 15 and valve 9 or 10. Bypass valve 23 may be a 3-way valve that is opened to bypass 22 while the backup heater is being fired, and opened to flow to storage 1 at other times. (The control circuitry is believed to be obvious to one skilled in the art and is not illustrated here.)

In FIG. 5 a bypass and valving may be used similar to that in FIG. 1, if desired.

FIGS 5, 5A and 5B illustrate modifications wherein valve 9A may be opened to permit circulation of water by pump 13 in a loop comprising primary solar heat storage tank 1, T.S.U. meter 6, backup heat source/secondary solar heat storage device 15A, valve 9A, circulating pump 13, and interconnecting piping.

An example to illustrate the value of the FIGS. 5, 5A and 5B modifications would be as follows. Suppose primary solar heat storage device 1 has a capacity of 80 gallons. Without the present invention there are major drawbacks: 1. There is only 80 gallons of stored solar heat on tap. The present invention adds to the amount of stored solar heat on tap. 2. The backup heater, even though insulated, keeps losing its heat and fires up repeatedly during nights and other non-use periods. That is very wasteful of backup heat energy even though there may be plenty of free solar heat in solar heat storage tank 1. And, 3. If the backup heater were shut off to save auxiliary energy that hot water would get cold every time there was a long non-use period. That cold water (say 40 gallons) would have to be drawn off before solar-heated hot water would arrive at the faucet from storage 1. The present invention overcomes those drawbacks.

Employing the invention of FIG. 5 Inventor Jack Thomason has found that pump 13 may be energized to produce desirable results by any one of several modes of operation. One example is to energize pump 13 to circulate the water during a time-period, say from 9:00 AM to 4:00 PM. Assuming solar heat is being collected, part of the heat from the solar hot water is transferred to backup heater secondary heat storage device 15A to make that hot water available at the tap 14 or for other use at 12, and the backup heat source's built-in thermostat keeps it shut off, thereby avoiding waste of large amounts of energy while using only a few watts per hour to run pump 13. Further, there are two tanks full of SOLAR-heated water available at the end of the sunny day, instead of only one as in a conventional 2-tank solar DHW system.

Another mode is to energize pump 13 while the solar collector is producing solar heat, with pump 13 being turned ON when the solar collector controller and pump 4A are turned ON.

Another mode of operation is to have pump 13 turned ON periodically, say ON for 30 minutes every three hours to periodically circulate the solar-heated water from primary solar-heat storage tank 1 to backup heater secondary heat storage 15A. That keeps heater 15A from coming ON as long as stored solar heat temperatures are higher than the temperature setting for backup heat in heater 15A. However, once backup heater 15A "fires up", then pump 13 should be de-energized to prevent pumping expensive backup heat back into the solar heat-storage tank 1. Also it may be desirable to close valve 9A to prevent thermosyphon heat transfer from heater 15A to storage 1. (The temperature in tank 1 should not be increased by backup heat because high temperatures in tank 1 require the solar collectors to operate at higher temperatures, with consequent lower efficiencies and less free heat collected from the sun.)

In all cases there are always TWO tanks filled with stored solar heat at the end of a sunny day. That means more usage of solar heat during heavy-usage or cloudy spells or at night, and less usage of backup heat.

The inventions of FIGS. 1 to 4 could be used together with the inventions of FIGS. 5, 5A, 5B, 6 and 7. Or they may be used separately.

FIGS. 6 and 7 may be better understood by giving some ideas as to possible examples. Dark cloudy days produce solar insolation at, say 100 to 150 BTUs per square foot per hour. Bright sunny days produce something like 250 to 350 BTUs per sq. ft. per hour.

So, in FIG. 6 photocell 20 should energize relay 16A to START pump 4A whenever there is bright sunshine, of the order-of 300 BTUs/sq./ft./hour, as on a bright sunny day following a snow. The photocell output is adjustable by 20A in a well-known manner so it can be fine-tuned to the precise turn-on and turn-off level of solar insolation desired for the particular installation.

But now, in FIG. 7, photocell 21 is used entirely differently. Its purpose is to positively disable relay 16A and turn pump 4A OFF during periods of very low insolation, such as at night, twilight, dark cloudiness, and so on. Here again, the photocell output is adjustable by 21A so it can be fine-tuned to the precise turn-off and turn-on level desired.

The inventions of FIGS. 6 and 7 may be used separately, or together in the same installation. For example, in Florida where snow does not occur, photocell 20 would seem to be unneeded. But, in New England, both photocells 20 and 21 would be valuable.

ELECTRICAL/AUTOMATIC CONTROLS

Automatic controls can be used to operate the apparatus disclosed herein and a few examples are described below.

FIG. 1 may use very simple controls, or slightly more complex controls. As an example, LOW-temperature water heater 11 could be a simple well-known domestic water heater, say 40 gallons capacity, having an ON/-OFF switch or its own automatic thermostat quickly settable to maintain minimum temperatures at, say 100° or 110° or 120°, or other. HIGH-temperature water heater 15 may be a similar domestic water heater with an ON/OFF switch or an automatic thermostat which may be set to maintain minimum temperatures at 120° or 140° or 180°, or other. For large commercial installations a large commercial DHW may be used at either 11 or 15 or both, say 80 gallons or larger. Or, a standard hot water furnace may be used at either 11 or 15.

Valves 9 and 10 may be automatically controlled by simple thermostats or by other automatic or manual switching means. As an example, pump 13 may be energized and solenoid or motor-operated valve 9 opened automatically whenever a thermostat 16 calls for heat. Solar-heated water will flow from storage 1 to load 12. That could be the first stage of a room or wall thermostat which will close anytime the room cools to a set temperature, say 70°. If the solar-heated water is hotter than the setting of the thermostat on LOW-temperature backup heater 11, it will stay turned OFF and solar-heated water will flow from storage 1 to load 12. If the water from storage 1 is not hot enough the thermostat on LOW-temperature water heater 11 will turn it on to boost the temperature of water going to load 12. But then, if the temperature drops to 68° the second stage of the room thermostat 16 may open valve 10 to allow HOT water from HIGH-temperature heater 15 to pass to the load 12. The design-Engineer could choose to have valve 9 close, or remain open, when valve 10 opens, to supply HIGH-temperature water only to load 12, or a mixture of HIGH and LOW temperature water. (The same type of operation could be used for FIGS. 2 or 3.) Alternatively backup heater 11 could remain OFF until the second stage of room thermostat 16 calls for more heat than the solar-warmed water can supply.

In FIGS. 2 or 3, room thermostat 16 could be of the 3-stage type to open valve 9 for the first stage (and turn pump 13 ON) to circulate solar-heated water and/or water from LOW-temperature heater 11 to load 12. If the room temperature drops, the second stage may open valve 10 to allow HOT water from HIGH-temperature heater 15 to flow to load 12. Valve 9 may remain open to allow both LOW and HIGH-temperature heat from heater 11 by closing valve 9 and would leave valve 10 open to allow HIGH-temperature water only to flow to load 12.

In FIG. 3, if scalding HOT water only is to be supplied to load 14 (to wash dishes, or such), then a switch may be activated during usage at 14 to close valve 9 and open valve 10. As an example, that switch may be activated due to FLOW at 14 or by a thermostat which will open valve 10 and close valve 9 anytime the temperature at 14 is too low, or due to flow and too low a temperature at 14.

FIG. 5 may use automatic controls including the thermostat built into secondary heat storage/domestic water heater, or furnace, 15A. It is set for the highest temperature needed at either load 12 or load 14 to keep the water heated, at a minimum, to that temperature level at all times. (Of course an override switching means may be used to lower that temperature setting or to disable the heater when stored solar heat is adequate and little or not backup heat is needed.)

Valve 10 may be opened and pump 13 turned on by a room/wall thermostat 16 and relay 16A (or other means) when heat is needed at load 12. Or, valve 9A may be opened and pump 13 is to be transferred from solar heat storage tank 1 to water heater/heat-storage tank 15A.

FIG. 5 illustrates means 17 which may be a combination of two well-known switching means: 1. a solar pump controller which turns pumps 4A and 13 ON and opens valve 9A to recirculate solar-heated water from storage 1 to storage/heater 15A while the sun is shining and; 2. a time switch which energizes pump 13 and opens valve 9A periodically to circulate solar-heated water from storage 1 to storage/heater 15A while the sun is not shining (example; ON for 15 minutes, OFF for 2 hours).

Or, as in FIG. 5A, valve 9A may be opened and circulating pump 13 energized by a simple time switch 17A, to operate periodically, without regard to pump 4A, to transfer solar-produced heat from storage 1 to water-heater/heat-storage apparatus 15A. OR, as in FIG. 5B, the turn-on apparatus may be standard solar heat-collector pump control unit 18. It starts pump 4A and also starts pump 13, and also opens valve 9A to circulate water from heat storage tank 1 to water heater/heat storage tank 15A while solar heat is being collected.

Switch 19 may be a temperature differential switch used to disable operation of the heat-transfer means at any time the temperature level is lower in solar heat-storage unit 1 than in heat-storage backup heater 15A. That prevents waste of backup heat by preventing pumping it to the solar heat storage unit. Also that helps keep the temperatures down in solar heat storage unit 1 during periods of no solar heat-collections of high-rate water usage or low-rate water usage, so the solar heat collectors, when they come back on, operate at lower temperatures and higher efficiencies, collecting more free solar heat.

Switch 19 could, instead, be the automatic thermostat switch which fires up water heater 15A and which closes valve 9A to prevent heat transfer from 15A to 1 while 15A is firing.

FIG. 6 is a schematic of electronic apparatus which will cause the solar collectors to automatically clear themselves of snow. That is accomplished by pumping water (or other fluid) from heat-storage apparatus 1, or 11 or 15 (or any other heat source) to the collectors even though they are covered by snow. That relatively warm water melts the snow and/or causes it to slide off. The previous problem was that ordinary temperature-differential control unit 18 does not turn the heat-collector pump ON because snow over the collector glazing blocks out the sunshine. So, the sensor in the collector does not sense temperatures higher than those in storage and controller 18 does not turn the pump 4A ON even when the sun is shining brightly.

Photocell 20 is not mounted under the collector glazing where snow could obscure it from incoming sunshine. It senses sunlight and turns the circulating device 4A ON even if the heat sensor itself in the collector is beneath a snow covering. Photocell 20 is connected in parallel with controller 18 so that either one will cause circulator 4A to operate, at least during bright sunshine.

FIG. 7 solves a problem encountered by manufacturers of solar heat collector temperature-differential controls. Control 18 can malfunction due to several causes and can allow the collector circulator 4A to run at night or during cloudy spells. Photocell 21 is connected in series with controller 18 so that circulator 4A cannot operate unless there is sunlight available, as well as a higher temperature in the collector than in storage.

Instead of photocell 21 a time switch could be used to prevent operation at night, but that would not prevent operation during cloudy weather, during daytime.

I claim:

1. Heating and back-up heating apparatus comprising heat-producing means and heat-storage means, back-up heat means comprising both LOW and HIGH-temperature heaters, LOW-temperature and HIGH-temperature heat-use means, means to direct flow of heated fluid from said heat-storage means to said LOW-temperature heat-use means or from said heat-storage means to said HIGH-temperature heat-use means, said LOW-temperature heater being located between said heat-storage means and said LOW-temperature heat-use means.

2. Apparatus as in claim 1, and valve means to control flow from said heat-storage means and LOW-temperature heater to said LOW-temperature heat-use means.

3. Heating and back-up heating apparatus comprising heat-producing means and heat-storage means, back-up heat means comprising both LOW and HIGH-temperature heaters, LOW-temperature and HIGH-temperature heat-use mans, means to direct flow of heated fluid from said heat-storage means to said LOW-temperature heat-use means or from said heat-storage means to said HIGH-temperature heat-use means, said HIGH-temperature heater being located between said heat-storage means and said HIGH-temperature heat-use means.

4. Apparatus as in claim 3, and valve means to control flow from said heat-storage means and HIGH-temperature heater to said HIGH-temperature heat-use means.

5. Heating and back-up heating apparatus comprising heat-producing means and heat-storage means, back-up heat means comprising both LOW and HIGH-temperature heaters, LOW-temperature and HIGH-temperature heat-use means, said LOW-temperature and HIGH-temperature heaters being connected to said LOW and said HIGH-temperature heat-use means, means to direct flow of heated fluid from heat-storage means to said LOW-temperature heat-use means or from said heat-storage means to said HIGH-temperature heat-use means, said means to direct flow comprising valve means to direct flow through both back-up heaters simultaneously and in series to the LOW-temperature heat-use means.

6. Heating and back-up heating apparatus comprising heat-producing means and heat-storage means, back-up heat means comprising both LOW and HIGH-temperature heaters, LOW-temperature and HIGH-temperature heat-use means, said LOW-temperature and HIGH-temperature heaters being connected to said LOW and said HIGH-temperature heat-use means, means to direct flow of heated fluid from said heat-storage means to said LOW-temperature heat-use means or from said heat-storage means to said HIGH-temperature heat-use means, said means to direct flow comprising valve means to direct flow through both back-up heaters simultaneously and in series to the HIGH-temperature heat-use means.

7. Heating and back-up heating apparatus comprising heat-producing means and heat-storage means, back-up heat means comprising both LOW and HIGH-temperature heaters, LOW-temperature and HIGH-temperature heat-use means, said LOW-temperature and HIGH-temperature heaters being connected to said LOW and said HIGH-temperature heat-use means, means to direct flow of heated fluid from said heat-storage means to said LOW-temperature heat-use means or from said heat-storage means to said HIGH-temperature heat-use means, said means to direct flow comprising valve means to direct flow through both back-up heaters simultaneously and in parallel to their respective LOW-temperature and HIGH-temperature heat-use means.

8. Heating and back-up heating apparatus comprising heat-producing means and heat-storage means, back-up heat means comprising both LOW and HIGH-temperature heaters, LOW-temperature and HIGH-temperature heat-use means, said LOW-temperature and HIGH-temperature heaters being connected to said LOW and said HIGH-temperature heat-use means, means to direct flow of heated fluid from said heat-storage means to said LOW-temperature heat-use means or from said heat-storage means to said HIGH-temperature heat-use means, said means to direct flow comprising valve means to direct flow from the HIGH-temperature heater to the LOW-temperature heat-use means.

9. Heating and back-up heating apparatus comprising heat-producing means and heat-storage means, back-up heat means comprising both LOW and HIGH-temperature heaters, a plurality of heat-use means, and means to direct flow of heated fluid from said heat-storage means to a LOW-temperature heat-use means or from said heat-storage means to a HIGH-temperature heat-use means, and means to circulate the heated fluid in a loop comprising the heat storage means, the back-up heat means, the heat-use means, and thence back to the heat storage means.

10. Heating and back-up heating apparatus as in claim 9 and means to direct the fluid from the heat-use means back to the back-up heat means, thereby bypassing the heat storage means.

* * * * *